March 24, 1942. W. J. ENGELHART 2,277,310
BOTTLE BEVERAGE MIXING MACHINE
Filed Sept. 30, 1941 3 Sheets-Sheet 1

Inventor
William J. Engelhart
By L. B. James
Attorney

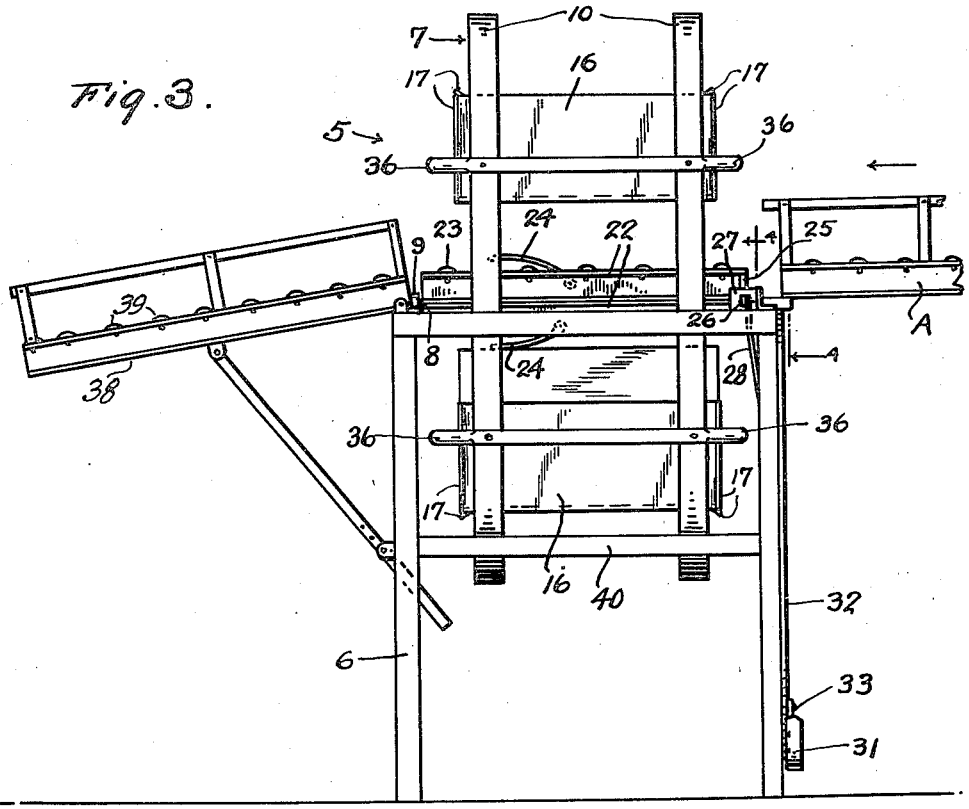
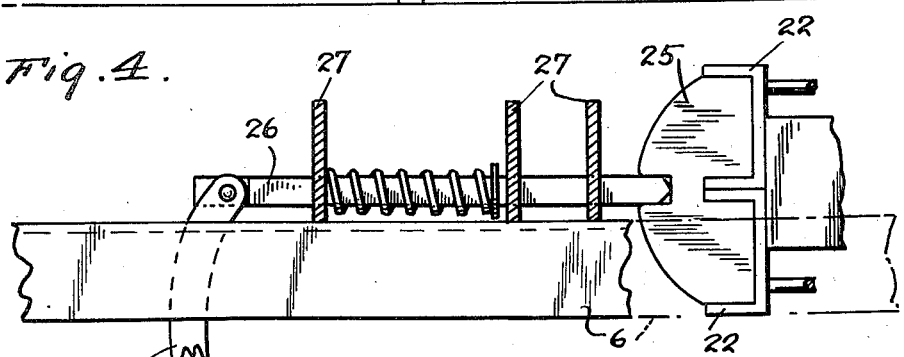
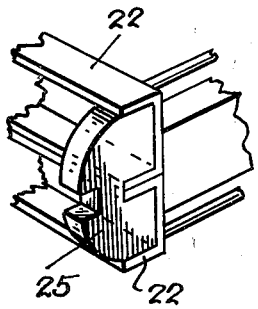

March 24, 1942.  W. J. ENGELHART  2,277,310
BOTTLE BEVERAGE MIXING MACHINE
Filed Sept. 30, 1941   3 Sheets-Sheet 3
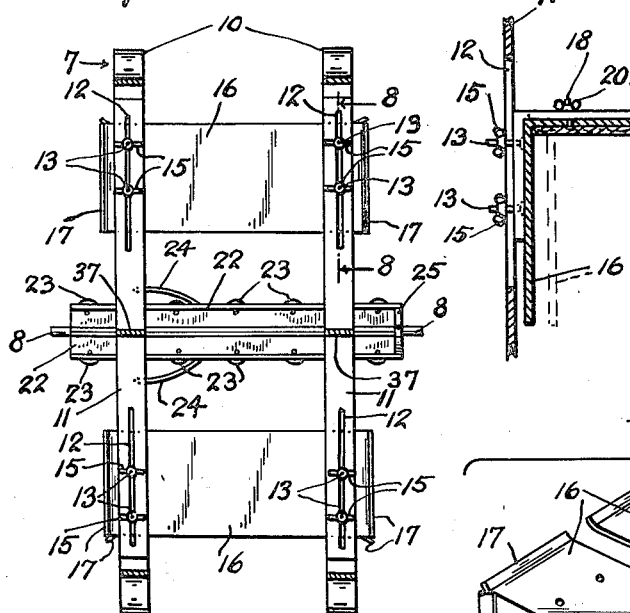
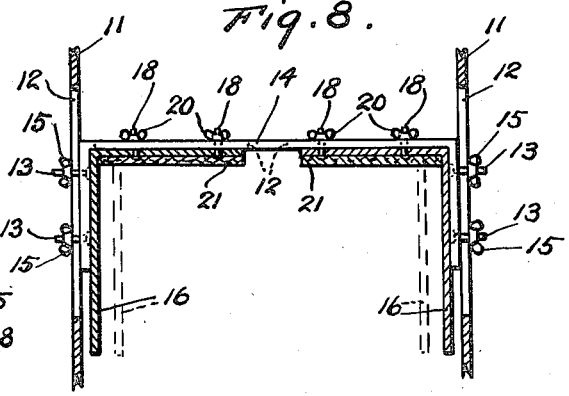
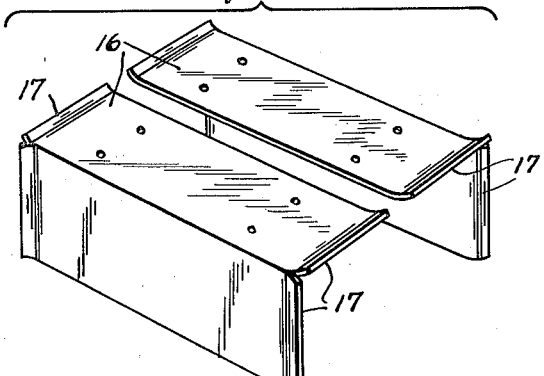
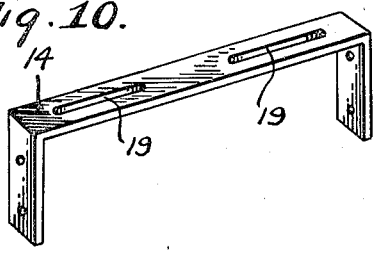
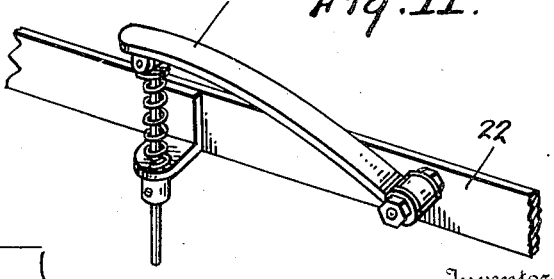
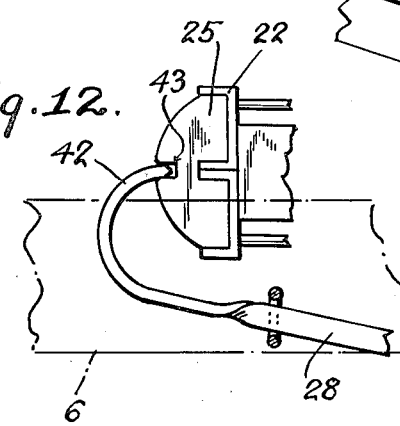
Inventor
William J. Engelhart
By L. B. James
Attorney Patented Mar. 24, 1942

2,277,310

UNITED STATES PATENT OFFICE 2,277,310

BOTTLE BEVERAGE MIXING MACHINE

William J. Engelhart, Flint, Mich.

Application September 30, 1941, Serial No. 413,036

2 Claims. (Cl. 259—57)

This invention relates to the official class of agitation and more particularly bottled beverage mixing machines.

The primary object of this invention resides in the provision of a bottled beverage mixing machine adapted to be disposed at the ends of the delivery conveyors of bottle capping machines to receive the filled crates and invert them so as to thoroughly mix the contents of the bottles disposed therein.

Another object of this invention resides in the provision of a bottled beverage mixing machine adapted to receive crates of bottles in upstanding position from the delivery conveyors of bottle filling and capping machines and rotate them to mix the contents of the bottles therein.

A further object of this invention resides in the particular locking means for the crate rotatable carriage.

A still further object of this invention resides in the particular means for retaining the crates on the crate rotatable carriage.

Aside from the foregoing objects this invention resides in the provision of means for holding the crates on the tracks of the rotatable carriage.

In addition to the above mentioned objects this invention resides in the provision of means for preventing damage or scratching of the bottle caps during rotation of the crate carriage and upsetting of the bottles within the crates.

Among the many objects of this invention is the provision of crate covers, carried by the rotatable carriage, adapted to be adjusted to receive crates of various heights and widths.

One of the salient features of this invention resides in the provision of a bottled beverage mixing machine adapted to form a unit in bottle capping, crating and delivery systems and perform the functions of its adoption with the minimum of labor and yet receive and deliver crates of filled bottles as they come off the conventional conveyors at their usual speed.

With these and other objects in view this invention resides in certain novel features of construction and arrangement of elements to be hereinafter more particularly set forth in the specification, illustrated in the accompanying drawings and pointed out in the appended claims and, while this disclosure depicts my present conception of the invention, the right is reserved to resort to such changes in construction and arrangement of elements as fall within the spirit of the invention.

In the accompanying drawings forming a part of this application:

Fig. 3 is a side view of the mixing machine disposed in operative position relative to a conventional conveyor.

Fig. 4 is an enlarged sectional view approximately on line 4—4 of Fig. 3.

Fig. 5 is a detail perspective view of a portion of the track carried by the rotatable carriage and one of the latch keepers secured thereto.

Fig. 6 is a similar view of one of the guide brackets for the latch bolts.

Fig. 7 is a sectional view approximately on line 7—7 of Fig. 1.

Fig. 8 is a similar view approximately on line 8—8 of Fig. 7.

Fig. 9 is a perspective view of one set of crate caps carried by the rotatable carriage.

Fig. 10 is a perspective view of one of the crate cap supporting brackets.

Fig. 11 is a perspective view of a portion of the crate track of the rotatable carriage showing the crate stop secured thereto.

Fig. 12 is a modified form of one of the rotatable carriage locks.

Figure 1:
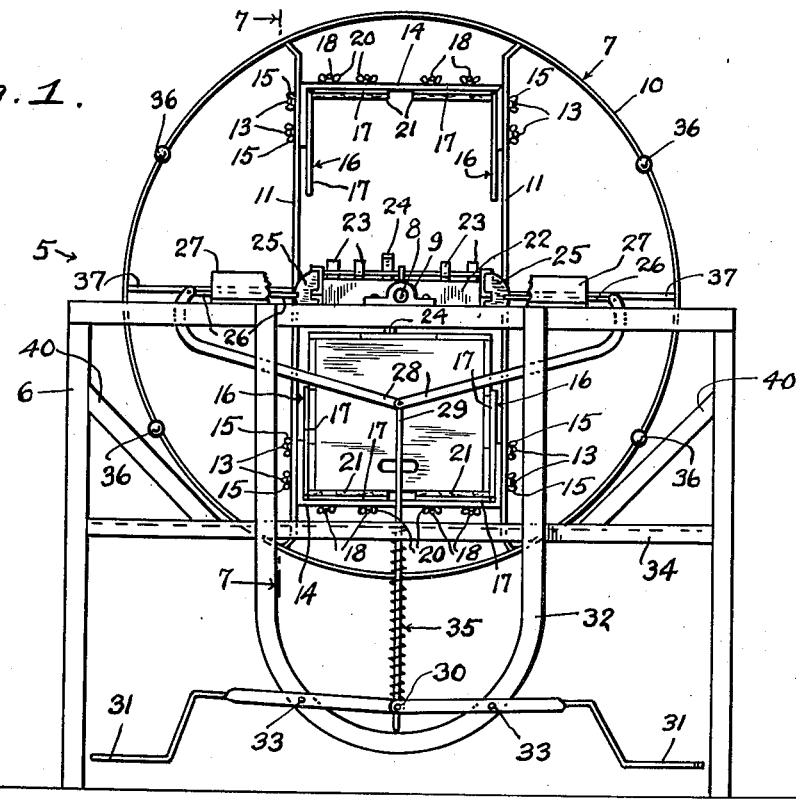
Fig. 1 is a front view of the mixing machine.
Figure 2:
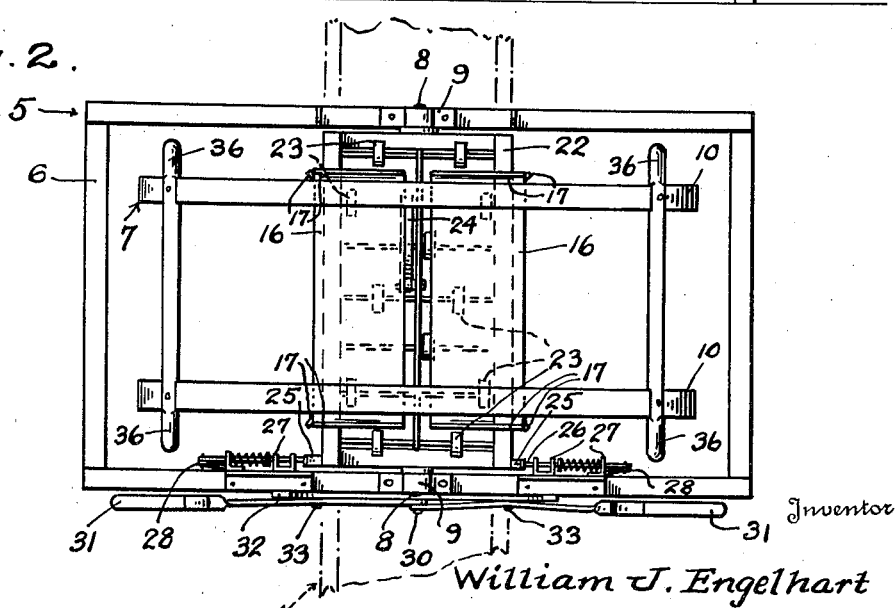
Fig. 2 is a plan view thereof with the delivery conveyor thereof removed.

In the present embodiment of this invention the numeral 5 designates, in general, a bottled beverage mixing machine adapted to successively receive crates of filled bottles in upright positions from a conventional delivery conveyor A leading from a bottle capping machine, not shown, said machine consists of a supporting frame 6 suitably braced and mounting a rotatable carriage 7 thereon through the instrumentality of a shaft 8 journalled in box bearings 9 suitably secured to the frame.

The carriage 7 is preferably constructed from spaced hoop-shape bands of metal 10 supporting therein vertically spaced standards 11 provided with elongated slots 12 to receive the free ends of bolts 13 or the like connecting brackets 14 therebetween. Said bolts are provided with the thumb-nuts 15 to retain the brackets in adjusted positions determined by the heights of the crates to be delivered to the rotatable carriage.

Carried by the brackets 14 and adjustable laterally relative to the standards 11 are crate caps 16 formed of sheet metal and having the receiving and delivery ends flared outwardly as indicated by the numeral 17 to permit crates to readily slide therebeneath, said caps are secured to the brackets by bolts 18 passing through slots 19 in the brackets and held in adjusted positions by thumb-nuts 20 and, in order to prevent the heads of the bolts from scratching or damaging the bottle caps as the carriage is being rotated, rubber or other suitable pads 21 are secured to the inner upper surfaces of the caps and over the heads of the bolts.

Axially carried by the rotatable carriage between the opposed crate caps and welded or otherwise secured to the shaft 8 are oppositely disposed crate receiving tracks 22 provided with rollers 23 and spring extended stop shoes 24, said tracks are adapted to align with the delivery conveyor A when in crate receiving relation therewith to permit the crates coming off the conveyor to readily slide thereon under the caps.

Secured to sides of the crate receiving ends of the tracks and adjacent the delivery end of the conveyor A are latch keepers or stop blocks 25 adapted to receive spring pressed latch bolts or plunger pins 26 slidably mounted in suitable brackets 27 secured to the frame, said latch bolts have their outer ends connected to downwardly extending links 28 pivotally secured to the upper end of a rod 29 which in turn is pivotally connected, as indicated by the numeral 30, to the inner ends of oppositely extending treadles 31 supported on a yoke 32 carried by the frame as by pivots 33. Surrounding the rod 29 between its lower pivoted end and a brace 34 secured to the frame is an expansion coil spring 35 adapted to retain the treadles in normal raised positions and links 28 in downwardly extending positions for lateral movement at their upper ends when the treadles are depressed and the connected ends of the links are raised by the rod.

The rotatable carriage is provided with a plurality of cross-bar or other suitable type of handles 36 while the standards and tracks thereof are retained in rigid relation relative to the bands 10 by suitable braces 37 or the like.

Hingedly disposed on the delivery end of the frame in alignment with the track of the rotatable carriage and in normal or crate receiving alignment with the conveyor A is an adjustable inclined conveyor, chute or the like 38, the same preferably provided with rollers 39 or constructed similarly to the tracks employed on the rotatable carriage.

In order to retain the frame in rigid condition suitable braces, such as indicated by the numeral 40, are disposed at points requiring the same.

In the modified form of the rotatable carriage latching means, as shown in Fig. 12, the links 28 are slidable on the frame and provided at their upper or free ends with dogs 42 adapted to normally seat in notches 43 in the latch-keepers 25.

With a machine constructed as aforesaid and disposed at the delivery end of a conveyor leading from a bottle capping machine, crates will be successively delivered thereto and retained on the receiving track thereof by the stop shoe, whereupon the operator depresses a treadle to release the rotatable carriage locking means so as to permit him to rotate the carriage with an upright and inverted crate thereon as many revolutions as found proper to mix the contents of the bottles within the crates and, in this connection, it has been found that but two revolutions thereof is necessary in so mixing bottled beverages. Subsequent to rotating the carriage the proper number of revolutions, the treadles are released and, when the latch keepers align with the latch bolts, rotation of the carriage will cease and the then upright crate will be shoved off the track of the carriage onto the delivery conveyor thereof from which it will be disposed of in the usual manner.

Although the machine as herein disclosed is operable by hand, it is within the purview of this invention to employ power transmitting means connected to the rotatable carriage and controlled by the treadles or other well known means.

With this invention fully described, it is manifest that a bottled beverage or other bottled liquid mixing machine is provided which will readily form an adjunct of bottle capping and delivery systems without alteration thereof and, through the simplicity of construction and operation thereof, the same can be operated by unskilled labor with the speed of delivery considerably stepped up over present systems.

Having thus described my invention what I claim and desire to protect by Letters Patent is:

1. In a bottled beverage mixing machine, a supporting frame, a rotatable crate holding carriage axially journalled in said frame and provided with diametrically opposed crate receiving tracks, latch keepers carried by said tracks each having an arcuate latch engaging surface and a latch receiving notch centrally of the arcuate surface, spring actuated latches mounted on said frames and engaging normally in the notches of said keepers, means for simultaneously retracting said latches from said notches, and means for manually rotating said carriage.

2. In a bottled beverage mixing machine, a supporting frame, a rotatable crate holding carriage axially journalled in said frame, means for rotating the carriage, track means bisecting the carriage axially thereof, a pair of latch keepers carried by said track means at opposite sides thereof, said keepers each having a latch engaging arcuate outer face having a centrally disposed latch receiving notch, a pair of spring pressed latch bolts slidably mounted on said frame for cooperation with said keepers, a pair of levers each having one end pivoted to one of said bolts and extending downwardly and inwardly to the central line of said frame, the inner ends of said levers being pivotally united, a rod extending downwardly from the pivotal connection of said levers, and a pair of pedals pivoted to the lower end of said rod and extending centrally towards opposite sides of the frame.

WILLIAM J. ENGELHART.